ZV## UNITED STATES PATENT OFFICE.

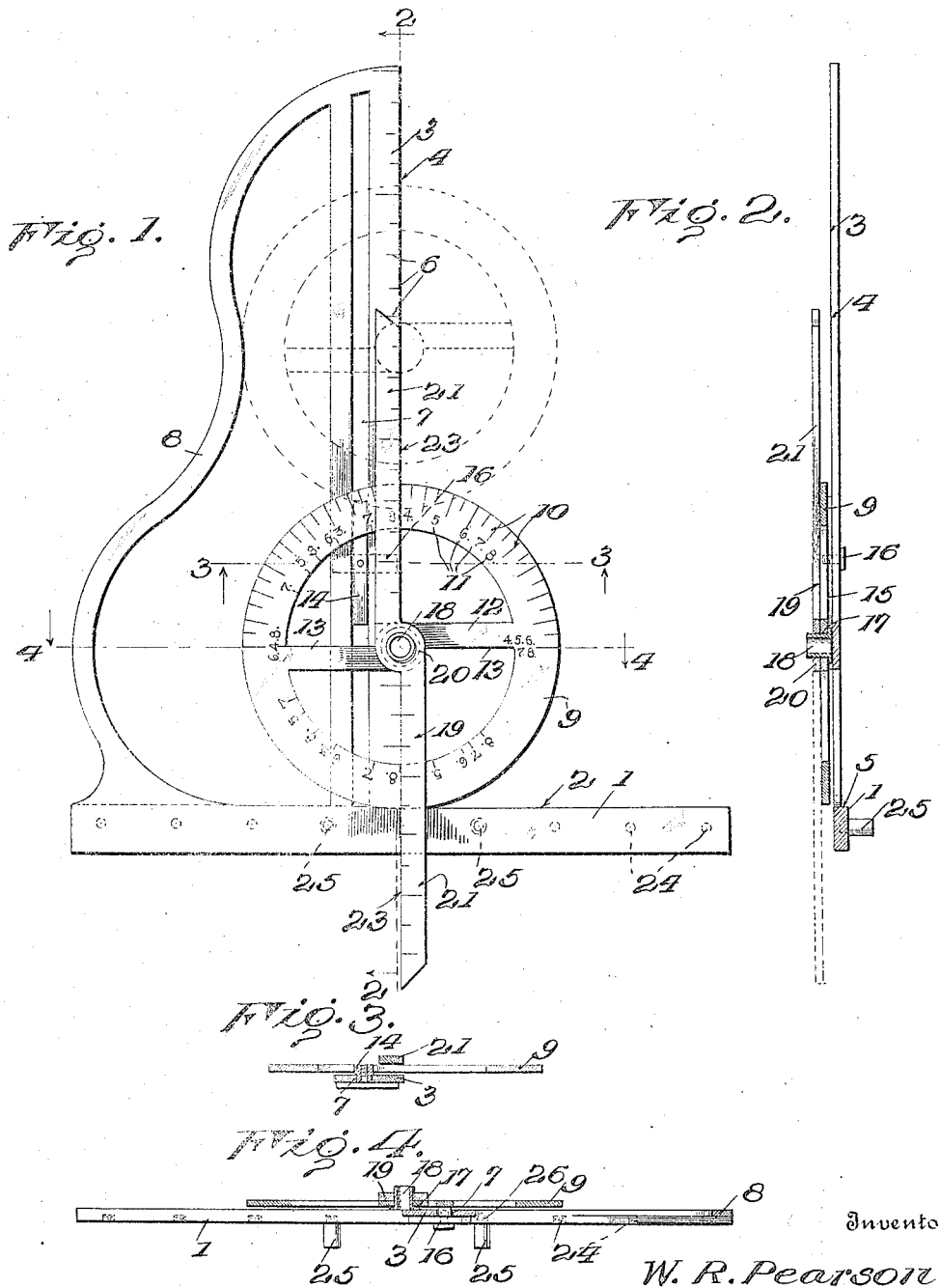

WILLIAM R. PEARSON, OF PORTLAND, OREGON.

DRAFTING INSTRUMENT.

1,302,207.

Specification of Letters Patent.

Patented Apr. 29, 1919.

Application filed May 28, 1918. Serial No. 237,022.

*To all whom it may concern:*

Be it known that I, WILLIAM R. PEARSON, a citizen of the United States, residing at Portland, in the county of Multnomah and State of Oregon, have invented certain new and useful Improvements in Drafting Instruments, of which the following is a specification.

This invention has as its object to provide an instrument which may be employed as a T-square, straight edge, curve, protractor, and as a device for finding the centers or axes of cylindrical or circular objects, for laying off gear blanks, for marking the location of bolt openings in flanges of pipe fittings and the like, and for various other purposes. The invention is also designed as an improvement over the instrument shown in my Patent No. 1,191,990, issued July 25, 1916.

A further object of the invention is to provide an instrument which, aside from its simple use as a T-square, straight edge, or curve, will be adapted for use in determining the true centers of cylindrical or circular objects as, for example, the centers or axes of shafts, wheel or gear blanks, etc., the instrument embodying means by which it may be readily adapted for application to work of various diameters.

Another object of the invention is to so construct the instrument that the same may be employed in accurately and expeditiously marking off the points of location of the teeth of gears and the location of bolt openings in the flanges of pipe fittings, cylinder heads and the like, regardless of the number of teeth or the number of bolt openings.

In the accompanying drawings:

Figure 1 is a plan view of the complete instrument embodying the present invention;

Fig. 2 is a vertical sectional view taken substantially on the line 2—2 of Fig. 1;

Fig. 3 is a transverse sectional view taken on the line 3—3 of Fig. 1;

Fig. 4 is a similar view taken on the line 4—4 of Fig. 1 looking in the direction indicated by the arrows.

The instrument embodying the present invention includes a head indicated in general by the numeral 1. The head 1 is designed to serve the part of the head of a T-square when the instrument is employed in lieu of such an instrument, and the said head includes a straight edge indicated by the numeral 2. The blade of the instrument is indicated in general by the numeral 3 and the same has a straight edge 4 which extends at right angles to the straight edge 2, the blade 3 extending bodily from the said edge 2 of the head 1 and being preferably integrally connected therewith. Both the head and blade are flat sided and the upper face of the blade is flush with or occupies the same plane as the upper face of the head although the lower face of the head 1 is located in a plane below that occupied by the under face of the said blade so as to provide a shoulder 5 as in the instance of an ordinary T-square. The blade 3 is preferably provided upon its upper face and along its straight edge 4 with scale marks 6 indicating inches and fractions thereof, or the units of some other system of linear measurement so that the blade may be employed as a rule or straight edge. The blade is also formed with a longitudinally extending slot 7, the walls of which are parallel to the straight edge 4 of the blade and this slot extends from the juncture of the blade with the head 1 to substantially the outer end of the said blade. The blade further includes a curvilinear portion 8 which may be employed in the drafting of irregular curves.

That part of the instrument which is to serve as a protractor and as a means for laying off the teeth of gear blanks or the bolt openings of pipe fittings or the like, is detachably assembled with the portion of the instrument above described, and includes an annular head 9 provided upon its upper face and at its outer periphery with a protractor scale indicated by the numeral 10. Upon the said upper face of the protractor head 9 at the inner periphery thereof are a number of scale marks 11 designated by suitable numerals and designed to serve a purpose to be presently explained. The head is provided within its opening with a spider 12 the arms of which have straight edges 13 in longitudinal alinement with each other and radial to the axis of the head 9 as a whole. A relatively narrow connecting portion 14 extends from the straight edge 13 of one of the arms of the spider 12 near the inner end of said arms, to the inner periphery of the protractor head 9, and this connecting portion is thickened so as to provide upon the under side of the said portion, a rib 15 which is of a width to slidably fit within the slot 7 in the blade 3 of the instrument it being understood that due to the provision of this means, the protractor head may be slid along the blade to any desired position. In order to hold the protractor head 9 assembled with the blade 3, a turn button 16 is swiveled to the under side of the rib 15 and when parallel with the rib may readily pass through the slot 7, but when turned at right angles will engage the under side of the blade 3 for the purpose stated. The protractor head 9 is formed at the juncture of the arms of its spider 12 with an opening 17 into which is permanently fitted a cylindrical tubular pivot post 18. The numeral 19 indicates in general a protractor blade having an intermediate head portion 20 formed with an opening 21 designed to snugly receive the projecting end of the pivot post 18 although at the same time permitting of free turning movement of the said protractor blade about the said post as an axis. In addition to the head 20, the protractor blade includes arms 21 which extend in diametrically opposite directions from the said intermediate head portion 20 and which have straight edges 23 longitudinally alined with each other and radial to the axis of the pivot post 18. The protractor blade 19 is not permanently rotatably fitted upon the protractor head, but may be removed by slipping it off from the pivot post 18, as will be readily understood by reference to Fig. 2 of the drawings.

In its under side the head 1 of the instrument is formed with a number of sockets 24, which sockets are arranged in two series located at either side of a line forming an extension of the straight edge 4 of the blade 3, corresponding sockets of the two series being equidistantly spaced from the said extension of the straight edge. In connection with the head 1 there are provided a pair of studs 25 each having a reduced threaded end 26, the threaded ends of the studs being designed to be fitted into the sockets 24 selectively. Thus the studs may be arranged in any corresponding ones of the sockets of the two series and will then be equidistantly spaced from a line forming a continuation of the straight edge 4 of the blade 3.

The use of the instrument as a straight edge, T-square, and curve, will, of course, be readily understood, as also its use as a protractor, the straight edges 23 of the protractor blades 22 being designed to register, of course, with the protractor scale marks 10 upon the head 9. Assuming that the instrument is to be employed in determining the true center of a cylindrical or circular object or piece of work, the studs 25 are, if the work is of small diameter, fitted in the corresponding ones of the series of sockets 24 nearest the straight edge 4 or, if the work is of relatively large diameter, in other corresponding ones of the sockets of the series more remote from the said straight edge. After the studs have been fitted into place, and the protractor head 9 has been disconnected from the blade 3, the instrument is disposed against the end of the piece of work to be centered with the studs engaging the perimeter of the work, and a mark may then be drawn along the straight edge 4 at the approximate center of the work. The instrument may then be shifted about the perimeter of the piece of work and another or several other marks made until the point of intersection of the marks will indicate the center which it was desired to find. Of course, when it is desired to employ the instrument as a protractor, the protractor head 9 and blade 19 are again connected with the blade 3. When it is desired to make use of the instrument in locating or laying off the teeth of gear blanks or the bolt openings in pipe fittings or the like, the instrument is disposed against the work with the studs 25 engaging the perimeter of the work and the protractor head 9 is adjusted longitudinally of the blade 3 until the indicated center of the work is spotted through the tubular pivot post 18 and the protractor blade 19 is then manipulated in the following manner. The numbers which appear in association with the marks 11 indicate the number of teeth or bolt openings to be marked off at equal distances upon the work. For example, if eight equidistant points are to be marked off upon the work the protractor blade 19 is swung about its pivot until the straight edge of one of its blades registers with one of the marks 11 opposite which the numeral 8 appears and a mark will then be made upon the work beside the said straight edge. The blade is then further adjusted until the straight edge of one of its arms registers with another of the marks indicated by the numeral 8, and the foregoing operation is repeated until all of the eight points have been indicated upon the face of the work. Of course, if desired, the protractor scale 10 may be employed for this purpose by dividing the total number of degrees by the number of points to be marked off and then adjusting the protractor blade to register with multiples of the dividend obtained.

Having thus described the invention, what is claimed as new is:

The improved instrument herein set forth comprising a head, a straight edge blade extending therefrom at a right angle thereto and provided with a longitudinal slot, an annular head provided with a hub, oppositely disposed arms extending from the hub to the rim portion of said head, a connecting bar extending angularly from one of said arms near the inner end thereof to the rim portion of the head and having on its under side a longitudinal rib fitting slidably in the longitudinal slot of the blade, means on the under side of said rib to retain same in the slot of the blade, and a protractor blade pivotally mounted on the hub of the annular head.

In testimony whereof I affix my signature.

WILLIAM R. PEARSON. [L. S.]